(12) United States Patent
McGary

(10) Patent No.: US 8,503,620 B2
(45) Date of Patent: Aug. 6, 2013

(54) ADVERTISEMENT BASED RINGBACK SYSTEM AND METHOD FOR USE WITH A DIRECTORY ASSISTANCE SYSTEM

(75) Inventor: Faith McGary, Bethlehem, PA (US)

(73) Assignee: Grape Technology Group, Inc., Bethlehem, PA (US)

(*) Notice: Subject to any disclaimer, the term of this patent is extended or adjusted under 35 U.S.C. 154(b) by 802 days.

(21) Appl. No.: 12/455,490

(22) Filed: Jun. 1, 2009

(65) Prior Publication Data
US 2009/0304160 A1 Dec. 10, 2009

Related U.S. Application Data

(60) Provisional application No. 61/130,620, filed on May 30, 2008, provisional application No. 61/192,135, filed on Sep. 15, 2008.

(51) Int. Cl.
H04M 1/64 (2006.01)

(52) U.S. Cl.
USPC .......................... 379/70; 379/88.22

(58) Field of Classification Search
USPC .................... 379/88.22, 114.13, 70
See application file for complete search history.

(56) References Cited

U.S. PATENT DOCUMENTS

| | | | |
|---|---|---|---|
| 6,178,446 B1 * | 1/2001 | Gerszberg et al. | 709/217 |
| 6,351,279 B1 * | 2/2002 | Sawyer | 348/14.07 |
| 6,947,531 B1 * | 9/2005 | Lewis et al. | 379/114.13 |
| 6,952,469 B2 * | 10/2005 | Han | 379/142.17 |
| 7,899,173 B2 * | 3/2011 | Ahn et al. | 379/218.01 |
| 7,903,803 B2 * | 3/2011 | Raju et al. | 379/202.01 |
| 2001/0002209 A1 * | 5/2001 | Han | 379/142 |
| 2003/0050837 A1 * | 3/2003 | Kim | 705/14 |
| 2004/0114732 A1 * | 6/2004 | Choe et al. | 379/88.17 |
| 2005/0125286 A1 * | 6/2005 | Crippen et al. | 705/14 |
| 2006/0109970 A1 * | 5/2006 | Shim et al. | 379/207.16 |
| 2007/0033531 A1 * | 2/2007 | Marsh | 715/738 |
| 2007/0047727 A1 * | 3/2007 | Raju et al. | 379/373.02 |
| 2007/0047728 A1 * | 3/2007 | Raju et al. | 379/373.02 |
| 2007/0198443 A1 * | 8/2007 | Chernev et al. | 705/500 |
| 2007/0245882 A1 * | 10/2007 | Odenwald | 84/609 |
| 2008/0082421 A1 * | 4/2008 | Onyon et al. | 705/14 |
| 2008/0120176 A1 * | 5/2008 | Batni et al. | 705/14 |
| 2008/0319823 A1 * | 12/2008 | Ahn et al. | 705/10 |
| 2009/0089144 A1 * | 4/2009 | Hodge, Jr. | 705/10 |
| 2009/0132364 A1 * | 5/2009 | Agarwal | 705/14 |
| 2009/0304160 A1 * | 12/2009 | McGary | 379/67.1 |

OTHER PUBLICATIONS

Notification of Transmittal of International Search Report and the Written Opinion of International Searching Authority dated Sep. 21, 2009.

* cited by examiner

Primary Examiner — Joseph T Phan
(74) Attorney, Agent, or Firm — Sofer & Haroun, LLP

(57) ABSTRACT

A communication method includes the steps of receiving a call from a caller for connection to a subscriber, attempting a connection to the subscriber and retrieving a media file associated with the subscriber. The media file is played to the caller during a ring-back period of the attempted connection, playing of the media file to the caller is charged to the provider of the media file.

6 Claims, 12 Drawing Sheets

GUI 200

Selection Chart 202

| Tone | Incentive |
|------|-----------|
| 1 | XYZ..... |
| 2 | XYZ..... |
| 3 | XYZ..... |
| 4 | XYZ..... |
| 5 | XYZ..... |
| 6 | XYZ..... |
|   |   |

FIGURE 3

| Subscriber Database Entry 300 | |
|---|---|
| subscriber telephone number | subscriber personal information |
| Subscriber history 302 | Ring-back selection field 304 |

FIGURE 4

| Call history field 302 | | | | |
|---|---|---|---|---|
| Recent call | Number | Category | In/out | time and date |
| 1 | xxx-xxx-xxxx | Skiing (DA assist) | Out | XXXX |
| 2 | xxx-xxx-xxxx | Personal | Out | XXXX |
| 3 | xxx-xxx-xxxx | Pizza | Out | XXXX |
| 4 | xxx-xxx-xxxx | Skiing | In | XXXX |
| 5 | xxx-xxx-xxxx | home improvement | Out | XXXX |
| 6 | xxx-xxx-xxxx | Personal | In | XXXX |

FIGURE 6

| 800 caller indicates acceptance of advertisement ring-back |

| 802 during a call made by a caller, a ring-back is selected for the caller |

| 804 the ring-back is played to caller during the ring-back period |

| 806 results and tracking data are stored from the ring-back play |

FIGURE 10

| Caller 2 history record 900 | | | | |
|---|---|---|---|---|
| Recent call | Number | Category | In/out | time and date |
| 1 | xxx-xxx-xxxx | building material | Out | XXXXX |
| 2 | xxx-xxx-xxxx | personal | Out | XXXXX |
| 3 | xxx-xxx-xxxx | sports/ent. | Out | XXXXX |
| 4 | xxx-xxx-xxxx | building material | In | XXXXX |
| 5 | xxx-xxx-xxxx | building material | Out | XXXXX |
| 6 | xxx-xxx-xxxx | personal | In | XXXXX |

FIGURE 11

ADVERTISEMENT BASED RINGBACK SYSTEM AND METHOD FOR USE WITH A DIRECTORY ASSISTANCE SYSTEM

RELATED APPLICATIONS

This application claims the benefit of priority from U.S. Provisional Patent Application No. 61/130,620,filed on May 30, 2008 and U.S. Provisional Patent Application No. 61/192, 135,filed on Sep. 15, 2008,the entirety of which are incorporated by reference.

BACKGROUND

1. Field of the Invention

This application relates to telephonic ringing condition. More particularly, the present application relates to a modified ring-back feature.

2. Description of Related Art

The ring-back tone, used in both land line and mobile telephone communications is the tone heard by the calling party while they are waiting for the called party to answer its phone. This ring-back tone, which is typically a telephone ringing sound reminiscent of earlier land line telephones, lets the caller know that the phone is ringing on the called party's end. In the absence of the tone, the caller is notified of a problem and may attempt to re-dial the number or call a different number.

Recently, personalized ring-back tones have been offered to phone service subscribers, allowing them to set their own ring-back tone that is played to calling parties while their phone is ringing. For example, a subscriber to a mobile phone may elect, or pay, to have a certain popular song played instead of the normal ring-back tone. When others attempt to call them, they will hear the song instead of the normal ring-back tone to let them know that the subscriber's phone is ringing.

OBJECTS AND SUMMARY

In one embodiment, it is one object of the present arrangement to provide a modified ring-back to a subscriber, where the modified ring-back tone is an advertisement played to called parties when they attempt to call the subscriber. The advertisement is preferably in the form of a song or other musical arrangement, but may be any form of audible signal.

To this end, a communication method is provided for receiving a call from a caller for connection to a subscriber and attempting a connection to the subscriber. A media file associated with the subscriber is retrieved and played to the caller during a ring-back period of the attempted connection. The playing of the media file to the caller is charged to the provider of the media file.

BREIF DESCRIPTION OF THE DRAWINGS

FIG. 3 is a subscriber selection chart for a subscriber, in accordance with one embodiment;

FIG. 4 is a subscriber tracking record, in accordance with one embodiment;

FIG. 6 is a subscriber call history table, in accordance with one embodiment;

FIG. 10 is a flow chart of a caller side ring-back service, in accordance with one embodiment;

FIG. 11 is a caller call history table, in accordance with one embodiment; and

DETAILED DESCRIPTION

Figure 1:
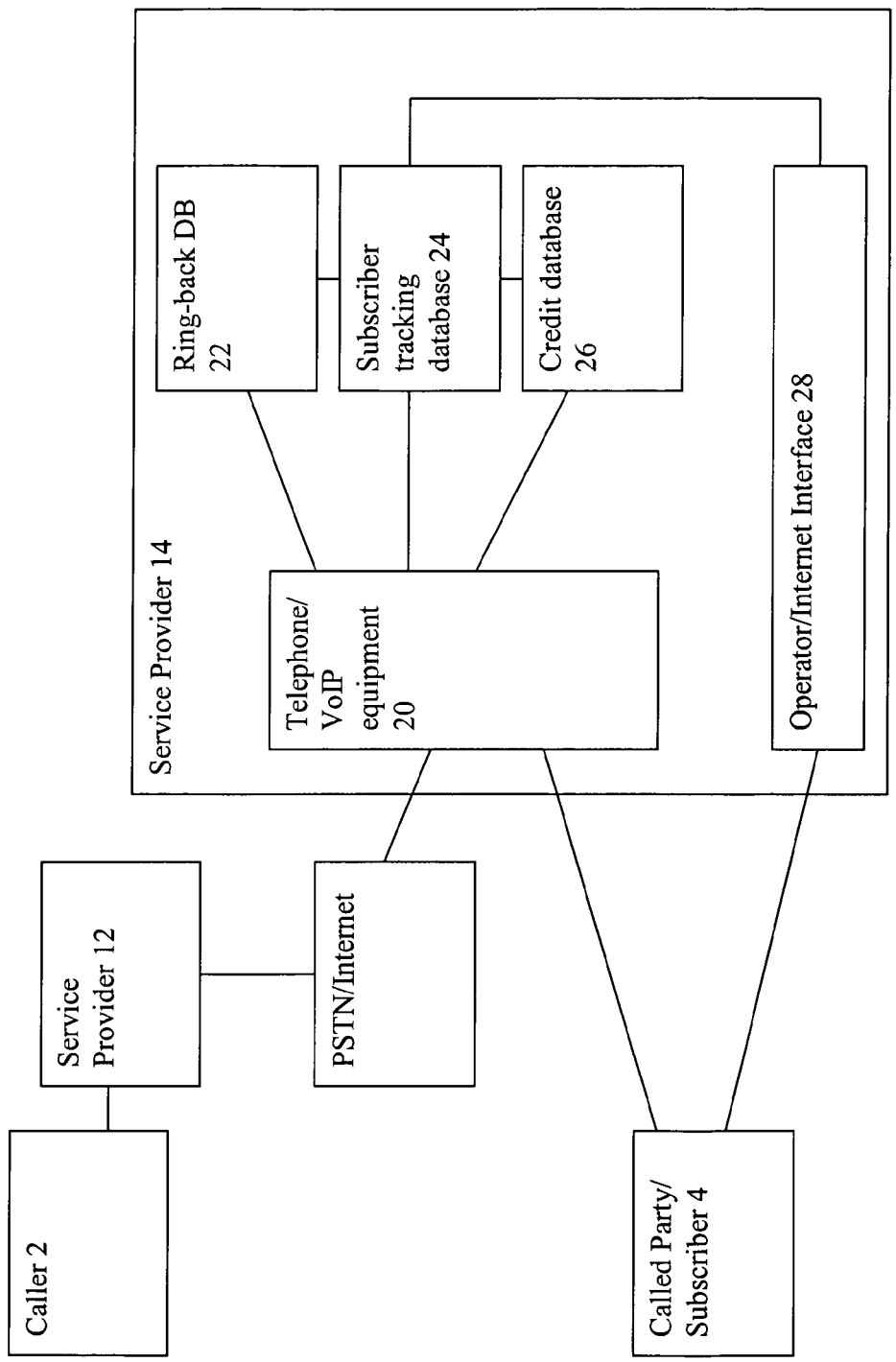
FIG. 1 is a diagram of a service provider that offers a ring-back service, in accordance with one embodiment.

In one embodiment, as shown in FIG. 1, a calling party 2 having a service provider 12, is connected to a subscriber 4 (called party) through the PSTN (Public Switched Telephone Network) or internet (for VoIP and Internet based calls).

Subscriber 4 is coupled to their service provider 14 that maintains the salient features of the present arrangement. As shown in FIG. 1, service provider 14 maintains telephony/packet switch (VoIP) equipment 20, a ring-back database 22, a subscriber tracking database 24, a subscriber credit database 26 and an internet/operator platform subscriber interface module 28.

Telephone switch equipment 20 may be any form of telephonic handling equipment for handling incoming and outgoing calls for subscriber 4. It is understood that aside from typical communications handling, telephone switch equipment 20 is only required to be able to handle the ring-back functions described herein.

Ring-back data-base 22, is configured to store various ring-back tones including but not limited to audio tones, digital music files and other such audible or multimedia signals. As described herein, ring-backs stored in database 22 include at least advertisements from various providers that have either been submitted to or solicited by service provider 14. However, it is understood that additional non-advertisement material may be stored in database 22 as well.

Tracking database 24 tracks the various telephonic usages of subscriber 4 including but not limited to all incoming and outgoing calls, subscriber usage of directory assistance (including those handled by service provider 14 as well as by third party providers), concierge services, etc. . . . The record of such tracked calls is described below in more detail.

Credit database 26 stores the various times that a ring-back, selected by subscriber 4 to be played to various calling parties 2, is played. As described below, subscriber 4 may receive certain credits each time their ring-back is played to callers 2, to be redeemed directly with service provider 14 or with third parties (such as the provider of the advertisement). Credit database 26 stores either the incidents of the playoff of ring-backs, the tallied credits earned or a combination of the two.

Internet—operator platform 28 provides an interface for subscribers 4 to either call service provider 14 or to connect on-line with service provider 14 in order to manage their ring-back tones and possibly track and/or redeem earned credits.

Figure 2:
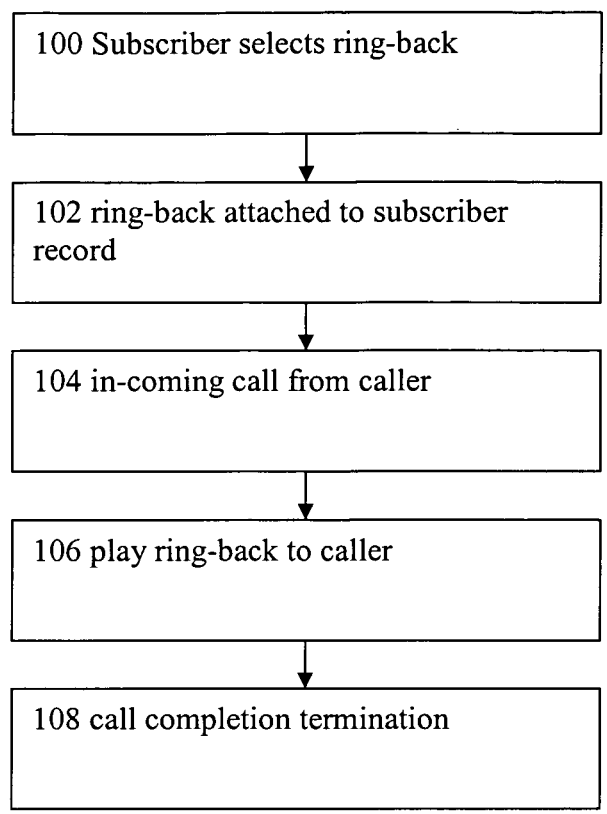
FIG. 2 is a flow chart of a ring-back service, in accordance with one embodiment.

In a typical operation flow, as shown in FIG. 2, at step 100, subscriber 4 selects a ring-back, such as an advertisement ring-back to be played to callers 2 when they call subscriber 4. After selecting a ring-back to be played to callers 2, at step 102 the ring-back selection is stored in subscriber database 24 associated with some identifier and record relating to subscriber 4.

At step 104, caller 2 calls subscriber 4 through service providers 12 and 14 respectively. It is understood that service providers 12 and 14 may be the same entity in the event that caller 2 and subscriber 4 use the same service provider. For the purposes of illustration, service providers 12 and 14 are shown separately.

Next, at step 106, after the initial telephony connection is completed between service providers 12 and 14, the selected ring-back tone, stored in ring-back database 22, is played to caller 2, while the phone of subscriber 4 rings.

In one arrangement, caller 2 not only hears the advertisement ring-back tone, but also hears a faint usual "ring-ring" sound so that caller 2 knows they are waiting for subscriber 4 to answer the call as opposed to thinking that they might have dialed a wrong number or got through to an IVR (interactive voice response) system. After subscriber 4 picks up, or some other terminating event occurs (busy signals, hang-up, call drop etc. . . . ) the process terminates at step 108.

The above described steps show the basic call flow for a subscriber 4 selected advertisement ring-back. The following descriptions of various implementations and variations of such a service relate generally to the various steps and modules described above in FIGS. 1 and 2.

In one arrangement as shown in FIG. 3, when subscriber 4 is selecting a ring-back to be played to a caller 2 they are able to select from a plurality of ring-back options. Subscriber 4 may connect via the internet through internet interface 28 or they may call via an operator platform 28 to make their selection. FIG. 3, shows a GUI (Graphical User Interface) 200 that is presented either directly to subscriber 4 when connected by the internet or to the operator when subscriber 4 is contacting service provider 14 by telephone.

Graphic user interface 200 maintains, at a minimum, a selection table 202 that includes a series of ring-backs that subscriber 4 may select from. In one arrangement, subscriber 4 benefits from selecting a ring-back advertisement to be played to a caller 2.

For example, a subscriber may select the CocaCola® jingle (such as the familiar "I'd like to buy the world a coke.") for supplanting their normal ring-back tones. Thus, when caller 2 attempts to call subscriber 4, either by directly dialing their number or by attempting to connect to the user via a directory assistance call, caller 2 hears the selected personalized branded audio ring-back. In exchange, subscriber 4 either receives a coupon or prize directly from CocaCola or a reduced cost from service provider 14 (paid for by the advertiser) or some combination of the two.

Obviously, the types and numbers of incentives that may be offered to subscriber 4 for selecting to have a particular ring-back used are too numerous to be listed in full. However, for the purpose of illustration, the incentive is assumed to be either a credit or coupon redeemable for some product or service provided by the advertiser, or a credit to their telephone bill from service provider 14 to be paid in part or in full by the advertiser in exchange for selecting their advertisement.

Selection table 202 is able to show subscriber 4 all of the various options for ring-back selection, with the associated incentive for selecting this ring-back. Additionally, table 202 may have a sample button, allowing subscriber 4 to hear the advertisement ring-back before being selected. It is noted that for illustration purposes, the ring-back is described as an audio file. However, it is understood that if the various devices of subscriber 4 and caller 2 supports such a feature, the ring-back may be a multi-media tone/display video that is shown to caller 2 during the ring-back period. As discussed below, in one arrangement, advertisers may bid or pay to be listed at or near the top of table 202 to encourage greater selection by subscribers 4.

As shown in FIG. 4, a subscriber database record 300 is shown for storage in subscriber database 24. Subscriber record 300 may include various telephone fields including, but not limited to subscriber telephone number, subscriber personal information and other such information. Additionally, it is contemplated that subscriber record 300 includes a calling history field 302 that includes the times, durations, origination and termination data for all incoming and outgoing calls to subscriber 4 as well as any directory assistance call information including the listing requested, the number of time a listing was requested, the categories of the listings requested (whether during a direct request or a "category" type request) and other such history information.

Additionally, subscriber database record 300 contains a ring-back field 304 that includes any ring-back codes necessary for playing the selected ring-backs to callers 2.

In one arrangement, if the subscriber desires, they may not only select an advertisement ring-back to be played to callers 2, but they may select multiple ring-backs to play at different times, or a rotating schedule or even different ring-backs for different specific callers 2 or classes of callers 2. For example a subscriber may select not to play advertisement ring-backs to personal calls (ie. from their contacts list), but may select to have advertisement ring-backs played to unknown parties. In each case, the level of incentive may be adjusted, according to whatever conditions are set by the advertiser.

Figure 5:
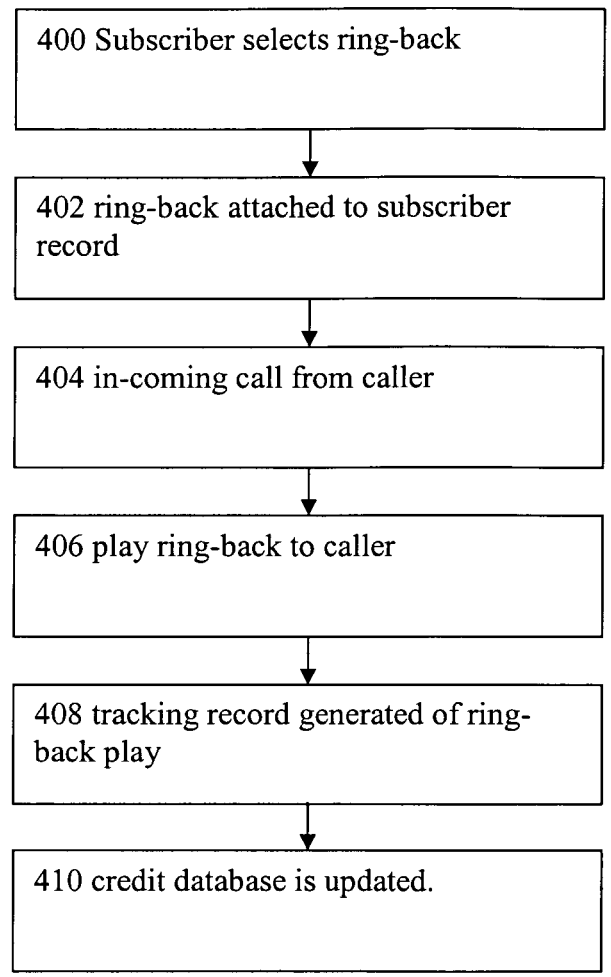
FIG. 5 is a flow chart of a ring-back service, in accordance with one embodiment.

As shown in flow chart FIG. 5, the various steps for tracking the incentives are shown, based on the ring-backs played to callers 2. As shown in FIG. 5, steps 400-406 are the same as described above for steps 100-106 from FIG. 2.

At step 408, once a ring-back is played to a caller 2, a notation of that playback is recorded in subscriber history 302 indicating that an advertisement ring-back, selected by subscriber 4 has been successfully played to a caller 2.

At step 410, a corresponding notation is made in credit database 26 of service provider 14, indicating that the incentive offered to subscriber 4 has been earned. It is noted that certain credits/incentives may be cumulative or require multiple playbacks to various callers 2, etc. . . . or they may be applied automatically, even for selecting their potential use in the first place (ie. even if no one calls subscriber 4). It is contemplated that credit database 26, in conjunction with subscriber history field 302 from tracking database 24 maintain whatever records for accounting that are required to track and fulfill the incentives.

In another embodiment, it is contemplated that certain providers of advertisement type ring-backs may desire to bid for certain advantages in being played to callers 2 via the ring-back tone of subscribers 4.

For example, FIG. 6, shows a typical call history field 302 from a subscriber 4. In the field 302, calls are numbered, identified as incoming or outgoing, identified if they were from or through directory assistance, have the category of the connected party as well as the time and date information.

Using the example given in FIG. 6, it is shown that in the most recent six calls for subscriber 4, two were related to the category skiing, possibly a ski slope or ski supply store. When discussing selection table 202 previously in FIG. 3, it was contemplated that the various available ring-backs/incentive combinations are arranged randomly or alphabetically etc. . .

. However, it is contemplated that certain advertisers may wish to pay or bid to have their advertisement ring-back listed higher on selection table 202.

In one arrangement, any advertiser may simply pay or bid to be listed first for all available subscribers 4. This may be the case for many generic advertisers such as soft drink companies, automotive sales, etc. . . . However, for certain smaller advertising budgets, advertisers may wish to target subsets of subscribers 4 with certain matching interests.

Figure 7:
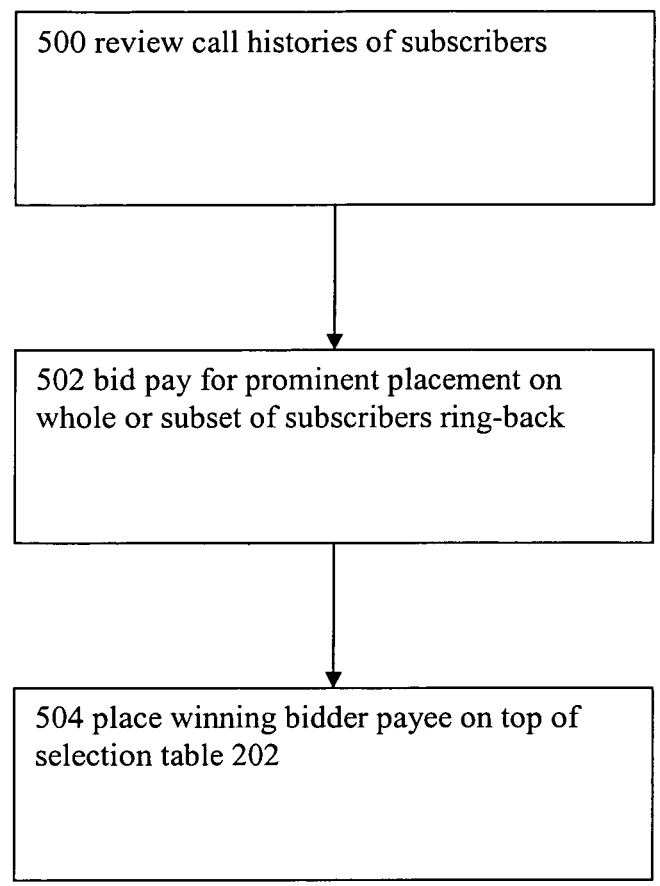
FIG. 7 is an advertiser bidding flow chart, in accordance with one embodiment.

In one example as shown in flow chart FIG. 7, at step 500, an advertiser may review (with privacy options available) subscriber histories 302 in an amalgamated form in order to pay or bid to be placed higher on the selection table 200. For example, for a subscriber 4 such as that shown in FIG. 6, a skiing advertisement may wish to be played to the various callers 2 that that subscriber 4 interacts with, given the higher probability that they may also be interested in skiing.

Although not shown in FIG. 6, aside from grouping of subscribers 6 into certain categories based on prior call history, subscribers 4 can directly reach service provider 14 via interface 28 and directly update their profile, stored within record 300 so that they can actively add certain preferences. This allows the subscriber greater control over which advertisements may be played to the callers 2 that call subscriber 4.

At step 502, advertisers may bid or present offers to service provider 14 and, at step 504 the winning bidder may be moved to the top of selection table 202 for particular subscribers 4. In the present example, the winning bidder for the subscriber 4 group of "skiing enthusiasts" would have their advertisement ring back option presented as the first or nearly first option on table 202.

Figure 8:
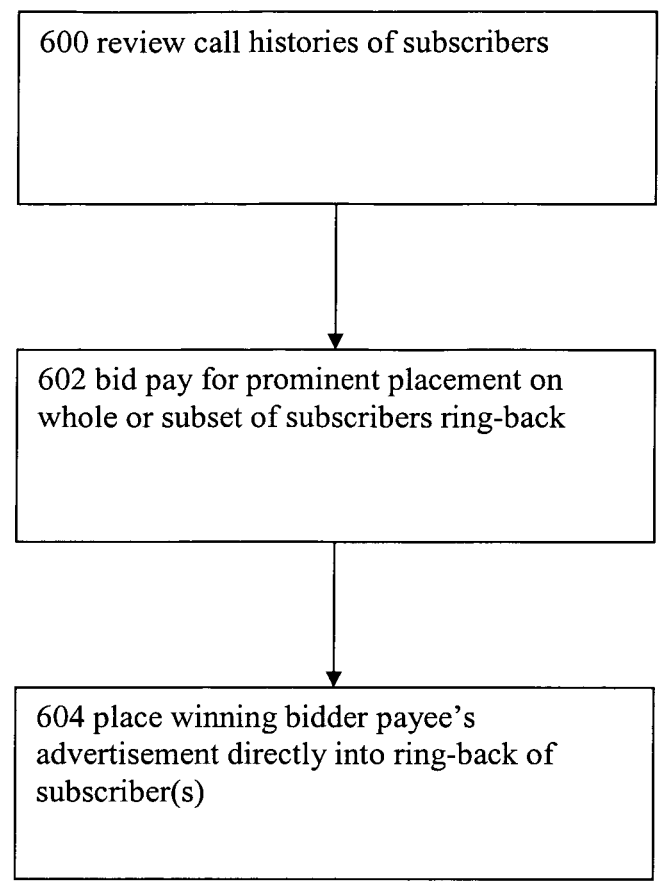
FIG. 8 is an advertiser bidding flow chart, in accordance with one embodiment.

In another embodiment, as shown in flow chart FIG. 8, steps 600 and 602 are the same as steps 500 and 502 respectively. However, at step 604, rather than the advertisers pay to be placed higher on selection table 202, advertisers may be paid/bid to be automatically placed into the ring-back of certain subscribers. In this arrangement, it is not contemplated that subscriber 4 receive incentives, rather service provider 14 receives direct benefits from the advertisers, including but not limited to an advertiser dollar paid, per playback of a ring-back to a caller 2. For example, if service provider 14, for a particular subscriber 4 plays a ring-back to 150 callers 2 in a month, then service provider 14 may receive a 1 cent per call advertising fee from the advertiser. It is further contemplated that such a system may still allow some subscriber 4 input, such as selecting of which advertiser ring-back to use with their ring-backs, but such an input is not required.

It is understood that the various permutations of how the tracked call history of subscribers 4 may be used by advertisers to pay or bid for more prominent placements are too numerous to detail in full. The present arrangement contemplates any similarly function ring-back advertisement arrangement where either the subscriber 4, service provider 14 or some combination of the two receive a benefit from the advertiser in exchange for having their advertisement played in the place of the normal subscriber 4 ring-back.

Figure 9:
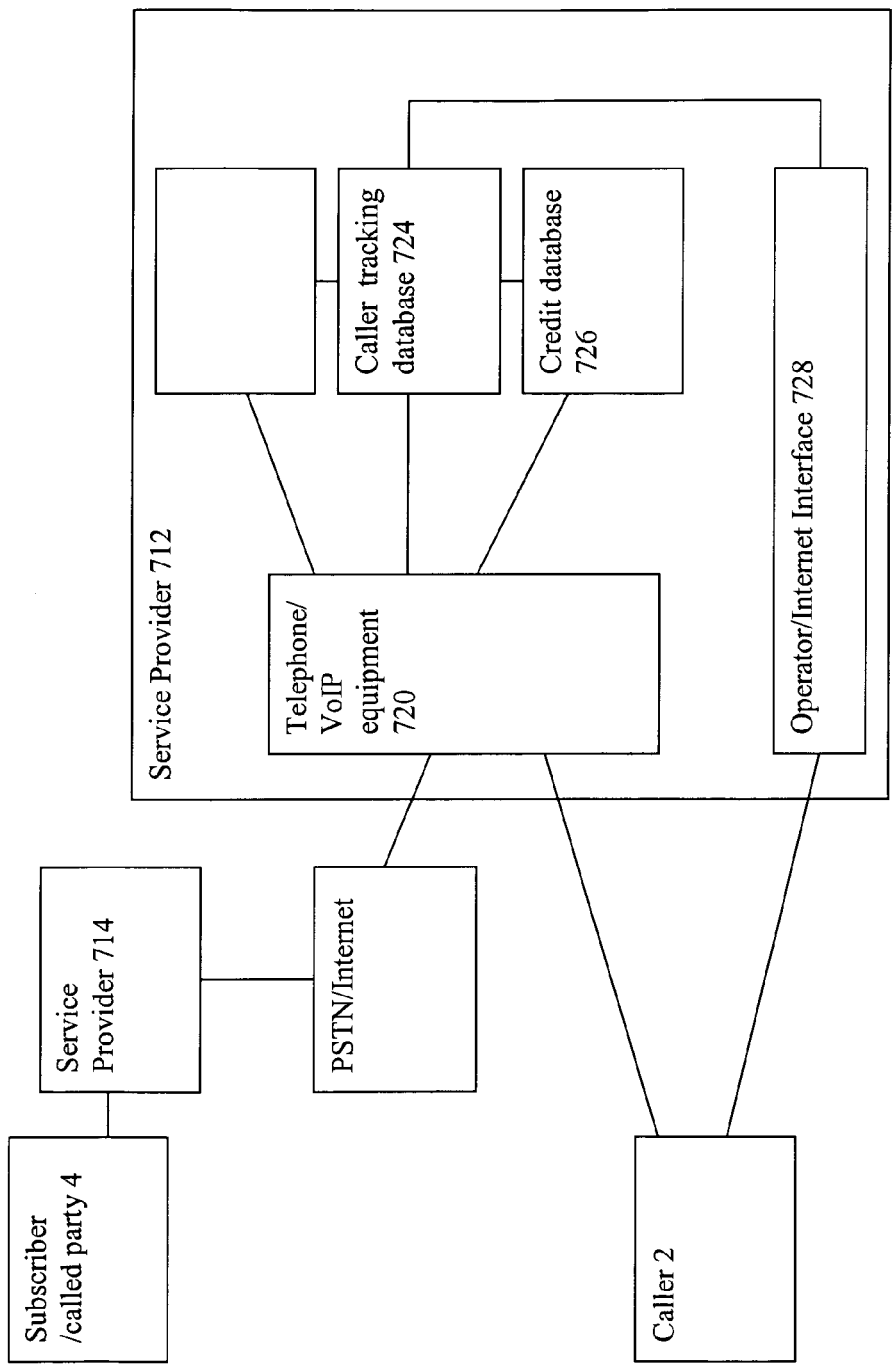
FIG. 9 is a diagram of a service provider then offers a ring-back service for a caller, in accordance with one embodiment.

In another embodiment, as shown in FIG. 9, a similar service may be offered on the caller 2 side. For example, rather than having subscriber 4 set the ring-back to be played to caller 2, callers 2 may elect to have advertisements, played to themselves, over top of the ring-back sent from service provider 14 of subscriber 4.

As shown in FIG. 9, service provider 12 is situated similarly to service provider 14 from FIG. 1. In each case, the elements shown 720, 722, 724, 726 and 728 provide substantially the same functions as described with relation to FIG. 1 for elements 20, 22, 24, 26 and 28 respectively. However, due to the different nature of a caller selecting the ring-back they will hear, regardless of whom they call, the differing ring-back selection operations are discussed below.

For example, as shown in flow chart FIG. 10, at step 800 caller 2 may simply log on through interface 728 and accept advertisements to be played to them during normal ring-back time, possibly with a faint ring-back in the background. At step 802, a caller 2 dials an outgoing number, and at step 804, during the ring-back period, service provider 12 plays an advertisement ring-back to caller 2. As with the subscriber 4 based system above, at step 806, any necessary earned credit data for caller 10 may be stored in credit database 726.

In another arrangement, as set forth in FIG. 11, similar to the arrangement with subscribers 4, service provider 12 may maintain a tracking record 900 for caller 2 showing their past calls, which are numbered, identified as incoming or outgoing, identified if they were from or through directory assistance, have the category of the connected party as well as the time and date information.

Additionally, tracking record 900 may provide a means for callers 2 to directly reach service provider 12 via interface 728 and directly update their profile, stored within or associated with tracking record 900 so that they can actively add certain preferences. This allows caller 2 greater control over which advertisements may be played to the callers 2 that call subscriber 4.

As with subscribers 4, callers 2 may be targeted by certain advertisers to have their ring-backs modified. For example, based on the exemplary record 900, caller 2 may be identified as a contractor or building materials buyer. A building supply house may wish to present advertisement or other material during that caller's 2 ring-back as well as other callers 2 having similar call patterns.

Figure 12:
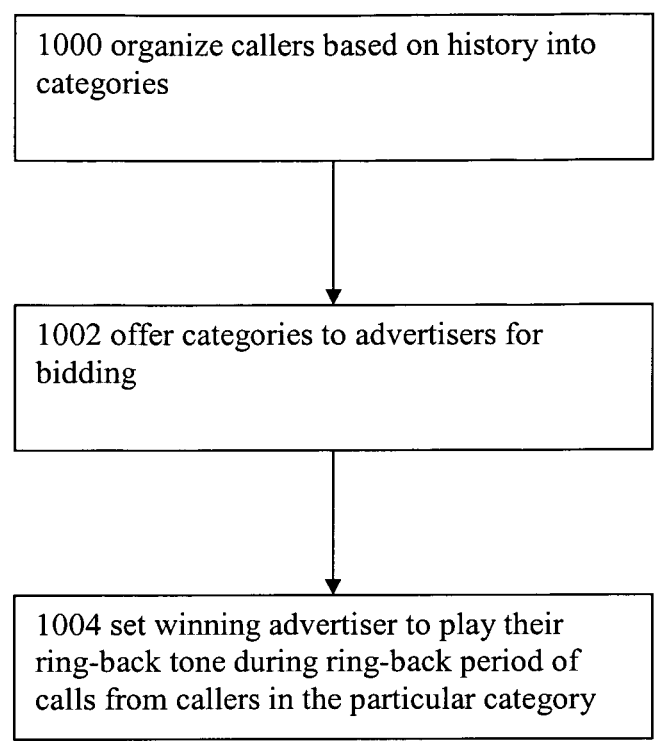
FIG. 12 is an advertiser bidding flow chart, in accordance with one embodiment.

For example, as shown in flow chart FIG. 12, at step 1000, the tracking records 900 of a plurality of callers 2 are analyzed and a plurality of callers 2 are identified and grouped into a series of various preferred caller categories. As an example, the caller 2 from FIG. 11 may be included in a preferred category for builders.

Next, at step 1002, various advertisers may bid to have their advertisements played during the ring-back period(s) of the callers 2 in one or more particular groups. A building materials advertiser may want their branded message to be played to callers 2 in the builders category.

At step 1004, once a winning bidder is achieved for a category of callers 2, service provider 12 then designates to play that advertiser's audio message during the ring-back period for those callers 2 in the category. Thus, when caller 2 makes a call through service provider 12, service provider 12 may check their ANI or MIN to determine if their associated tracking record 900 indicates that they are to receive an advertising media ring-back as described above.

It is noted that in each of the above examples, for both caller 2 and subscriber 4, the salient features are expressed in terms of telephone calls. However, it is understood that many text-related actions may take place during a telephone context, such a seeking call completion after a text message directory request. It is contemplated that the present arrangement may utilize embedded coding within the text messaging for call tracking purposes prior to playing any branded audio or multimedia messages during the ring-back period of call completion. Furthermore, to the extent the devices of caller 2 and subscriber 4 support such features, branded audio and multimedia ring-backs may include subsequent related text based coupons or other such redeemable text messages.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A communication method, said method comprising the steps of:
   receiving calls from a plurality of callers seeking connection to desired subscribers among a plurality of available subscribers;
   tracking a history of calls made by and received by said plurality of available subscribers;
   offering to advertisers the ability to generate an advertisement to be associated to said plurality of available subscribers to be played to said callers when attempting to connect said callers to a said desired subscriber among said plurality of available subscribers, wherein said advertiser may review said tracked call history of said plurality of available subscribers to select a sub-set of subscribers so as to associate said advertisement to said selected sub-set of subscribers;
   receiving a call from one of said callers attempting a connection to said desired subscriber among said plurality of subscribers, where said desired subscriber is also in said sub-set of subscribers to which at least one advertisement is associated;
   retrieving said advertisement associated with said subscriber in said sub-set of subscribers;
   playing said advertisement to said caller during a ring-back period of the attempted connection.

2. The communication method as claimed in claim 1, wherein said payment for said advertisement is based on the number of time said media file is played to said callers.

3. The communication method as claimed in claim 2, further comprising the step of tracking number of times said advertisement is played to various callers and storing said results in a file associated with said subscriber.

4. The communication method as claimed in claim 3, wherein said advertiser pays a fee to be automatically played as the ring-back to said caller during calls to said subscribers.

5. The communication method as claimed in claim 4, wherein said advertiser pays a fee to be played as the ring-back to said caller during calls to a subgroup of subscribers who are identified in a particular category.

6. The communication method as claimed in claim 1, wherein said advertisement is selected from the group consisting of audio files and multi-media files.

\* \* \* \* \*